United States Patent
Franke et al.

(10) Patent No.: US 10,164,818 B2
(45) Date of Patent: Dec. 25, 2018

(54) EFFECTIVE INDEXING OF PROTOCOL INFORMATION

(71) Applicant: International Business Machines Corporation, Armonk, NY (US)

(72) Inventors: Hubertus Franke, Cortlandt Manor, NY (US); Douglas M. Freimuth, New York, NY (US); David P. Olshefski, New York, NY (US); John M. Tracey, Scarsdale, NY (US); Dinesh C. Verma, New Castle, NY (US); Charles P. Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 15/285,972

(22) Filed: Oct. 5, 2016

(65) Prior Publication Data
US 2018/0097686 A1    Apr. 5, 2018

(51) Int. Cl.
*H04L 12/24* (2006.01)
*H04L 29/06* (2006.01)
*H04L 29/08* (2006.01)

(52) U.S. Cl.
CPC .......... *H04L 41/0273* (2013.01); *H04L 67/02* (2013.01); *H04L 67/1002* (2013.01); *H04L 67/28* (2013.01); *H04L 69/06* (2013.01); *H04L 69/22* (2013.01)

(58) Field of Classification Search
CPC . H04L 41/0273; H04L 67/02; H04L 67/1002; H04L 69/06; H04L 69/22
See application file for complete search history.

(56) References Cited

U.S. PATENT DOCUMENTS

| | | |
|---|---|---|
| 5,787,248 A | 7/1998 | Zupcsics |
| 6,275,861 B1 | 8/2001 | Chaudri et al. |
| 6,356,951 B1 * | 3/2002 | Gentry, Jr. ............ H04L 69/161 709/217 |
| 6,810,427 B1 | 10/2004 | Cain et al. |
| 7,434,045 B1 | 10/2008 | Enderwick et al. |
| 8,825,884 B2 | 9/2014 | Wang et al. |
| 2003/0079040 A1 | 4/2003 | Jain et al. |

(Continued)

OTHER PUBLICATIONS

RFC 2105 Cisco systems tag switching architecture overview (Feb. 1997) to Bekhter et al. ("Bekhter").*

(Continued)

*Primary Examiner* — June Y Sison
(74) *Attorney, Agent, or Firm* — Scully, Scott, Murphy & Presser P.C.; Rabin Bhattacharya (57) ABSTRACT

A downstream element in a pipeline processing a network flow receives a first request and executes an indexing function to compute an index into a control block for storing state information associated with the data packet. The downstream element transmits a request to an upstream element to include the index as a tag in one or more subsequent data packets that comprises the plurality of network fields and the associated values. Subsequent data packet may be received at the downstream element with the tag having the index information. The downstream element may process the subsequent data packet based on the tag without having to execute the indexing function on the subsequent data packet.

20 Claims, 6 Drawing Sheets

(56) References Cited

U.S. PATENT DOCUMENTS

| | | | |
|---|---|---|---|
| 2004/0205149 A1* | 10/2004 | Dillon | G06F 17/30902 709/217 |
| 2010/0272125 A1* | 10/2010 | Franke | H04L 69/22 370/476 |
| 2016/0134531 A1* | 5/2016 | Assarpour | H04L 45/74 370/392 |
| 2016/0295394 A1* | 10/2016 | Mijar | H04W 48/18 |
| 2016/0301739 A1* | 10/2016 | Thompson | G06F 9/541 |
| 2016/0330111 A1* | 11/2016 | Manghirmalani | H04L 43/08 |

OTHER PUBLICATIONS

NIST, "NIST Cloud Computing Program", http://csrc.nist.gov/groups/SNS/cloud-computing/index.html, Created on Nov. 15, 2010, Last updated on Sep. 21, 2016, 3 pages.

* cited by examiner

EFFECTIVE INDEXING OF PROTOCOL INFORMATION

FIELD

The present application relates generally to computers and computer applications, and more particularly to computer networks and communications.

BACKGROUND

Network centric workload in data centers often requires identical processing by several proxies and devices in a network pipeline, for example, before the workload is processed by a front-end application or back-end server. For example, processing of protocol requires maintaining states in a computer network system, which can cause significant processing latency, and doing so at several devices would compound the latency. A mechanism that could reduce a processing latency in processing network centric workload may be desirable.

BRIEF SUMMARY

A method and system of processing data packets in a pipeline of network proxies may be provided. The method, in one aspect, may include receiving at a downstream element in the pipeline a data packet from an upstream element in the pipeline, the data packet comprising a plurality of network fields and associated values. The method may also include determining that the data packet is a first request received to be tagged at the downstream element received. The method may further include executing an indexing function at the downstream element based on the plurality of network fields to compute an index into a control block for storing state information associated with the data packet. The method may also include transmitting a request to the upstream element to include the index as a tag in a subsequent data packet that comprises the plurality of network fields and the associated values. The method may further include receiving at the downstream element the subsequent data packet from the upstream element with the tag. The method may also include processing the subsequent data packet at the downstream element based on the tag without having to execute the indexing function on the subsequent data packet.

A system of processing data packets in a pipeline of network proxies, in one aspect, may include a downstream element running on at least one hardware processor and coupled to a communication network. A memory device may include a control block coupled to the downstream element. The downstream element may receive a data packet from an upstream element in the pipeline, the data packet comprising a plurality of network fields and associated values. The downstream element may determine that the data packet is a first request to be tagged received at the downstream element. The downstream element may execute an indexing function based on the plurality of network fields to compute an index into the control block for storing state information associated with the data packet. The downstream element may transmit a request to include the index as a tag in a subsequent data packet that comprises the plurality of network fields and the associated values. The downstream element may receive the subsequent data packet from the upstream element with the tag. The downstream element may process the subsequent data packet based on the tag without having to execute the indexing function on the subsequent data packet.

A computer readable storage medium and/or device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Data transmitted over a network, for example, from one computer device to another device is structured into packets, also called protocol data units, which contain a plurality of fields, including a protocol header that contains information about a specific communication protocol which the transmission uses. Network data may travel from computer devices acting as clients to computer devices acting as servers. Data transmitted from clients to servers is known as request and data transmitted from servers to client is usually known as response. Computing devices may act as proxy servers. A proxy server may be a dedicated computer or software running on a computer that acts as an intermediary between a client device and a server device, and may be used, for example, for load balancing or security reasons. Many proxy servers may exist between a client and the final backend server.

Based on incoming fields of protocol headers, an incoming request is mapped to a local state at each of processing proxy servers and the backend server. Each of proxy servers processes the request to provide information about its local state (either the entire state or an index (or pointer) information to a control block managing the state), for example, as a cookie, to the processing element in the front. On subsequent requests, one of the servers processing the request attaches that cookie to the request and eliminates the overhead of state maintenance or classification by the server receiving the cookie.

In data centers that process scalable workload, the following scenario may be encountered frequently. Multiple requests are obtained from the same client or customer (client device or customer device) at a data center. At each of different steps in processing of these requests, the incoming requests are processed and mapped into a state information control block for the request. A control information block or control block stores information and state about a request. The control information block used depends on protocol level at which the processing is being done. In the case of processing using Internet Protocol (IP) level header information that will be used by a firewall, the load-balancer and the Transmission Control Protocol (TCP) of a web-cache (proxy), the control information block mapping is done using the 5-tuple of IP source address, destination address, source port, destination port and the protocol. In the case of processing using the Hypertext Transfer Protocol (HTTP), additional information contained in the cookies of the HTTP and a Uniform Resource Locator (URL) being accessed can be used as additional parameters for determining what to do with the request. In the above example, the web-cache and single sign-on module may use HTTP level information for determining their processing information. Similarly, for Simple Object Access Protocol (SOAP), the service being accessed, the operation invoked on the service, and other information in Extensible Markup Language (XML) can be used for such a determination.

Figure 1:
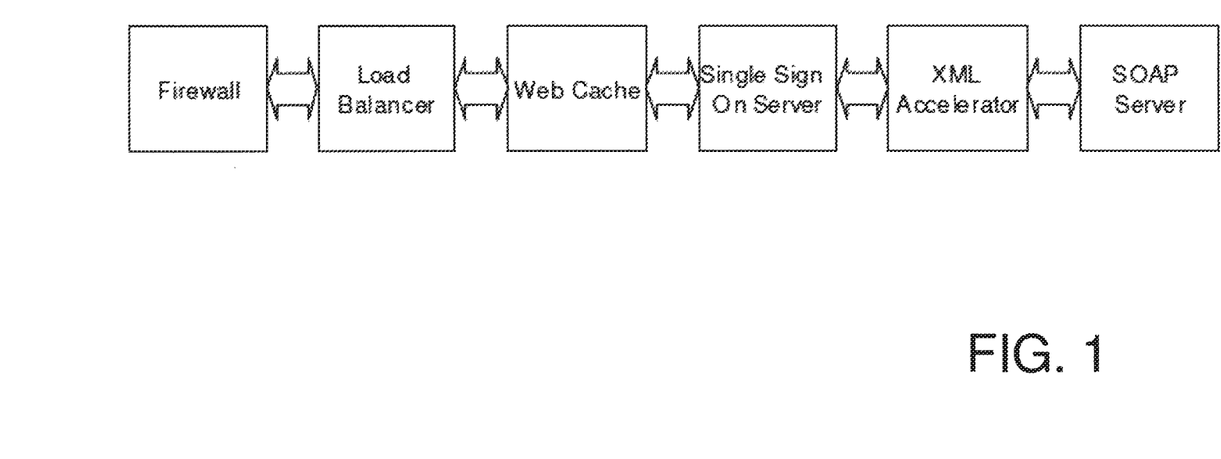
FIG. 1 shows example components involved in processing a workload request in one embodiment.

FIG. 1 shows example components involved in processing a workload request in one embodiment. The request is processed through a set of different devices, such as a firewall, a load balancer, a web caching proxy server, a single sign on server, a SOAP server, and/or others, leading eventually to a backend server. For ease of reference, each such device can be referred to as a box. The general processing at each of the boxes (components involved in processing the request) can be defined as a two-step process: first use the fields provided within the request to compute an index for a control block; and second, look up the data stored in the control block to process the request. Information contained in the control block may contain functions to perform on the incoming request, the amount of modification to be done on the incoming data, and/or others. Because of a large number of values that the 5-tuple or web-URLs or similar information can take, such computation of the control block data is usually expensive and can add a significant amount of delay. Such calculation may be redundant for all except the first box in the sequence processing any given request. In the above example, the first three boxes in sequence all use the IP 5-tuple for indexing because they operate at the IP protocol level in the networking stack used in the current state of the art. The third and fourth (at HTTP layer of processing) use Web URLs and cookies for indexing because they operate at the HTTP protocol level in the networking stack used in the current state of the art, and the fifth and sixth use the contents of the SOAP header envelop to perform the indexing. The processing steps can be performed much more effectively if indexing information done at one level can be effectively communicated to the next level.

At each of the protocols used in computer communications, there exists a mechanism for the front-end box to pass hints and information about the incoming request to the downstream box. As an example, for the IP protocol level there is an option to use the DiffServ field in IP header to pass up to 128 tags to the next machine. At the TCP protocol level, a private TCP option can be defined. At the HTTP protocol level, cookies can be defined, or private HTTP headers can be inserted. At SOAP level, extra XML tags can be inserted. These provide a mechanism for a box in the front to provide information to a box behind it. The system and method of the present disclosure in one embodiment may employ one or more of those mechanisms for coordination of the classifications.

The challenge in any such coordination of classifications is that the index block computed into each of the boxes is very specific to the processing at that box. For local efficiency, each box may have its own choice of data structures (a tree versus a list versus a stack) for organizing the control information blocks. They have different addresses in the control block. For these and other reasons, sharing indexing information among different boxes is non-trivial and difficult. An embodiment of a system and method in the present disclosure allows the first machine encountering the inbound request to classify the incoming request effectively for all of the proxies or servers that process the request.

In the present disclosure in one embodiment, a mechanism is presented to share the indexing information among different boxes processing requests using a coordination mechanism among the boxes. In a protocol, there is usually a first request and many subsequent requests on the same nature following the first request. When the first request arrives at the various devices responsible for processing a request, the devices compute their normal indexing functions. However, each device also passes the information about the index that it has computed to the device which is preceding it in the request processing using the same protocol and fields for indexing. On subsequent requests, the first device includes the information provided by the indexing from the subsequent box to the next stage of processing, and that information is then used to expedite the indexing function at the second stage.

Figure 2:
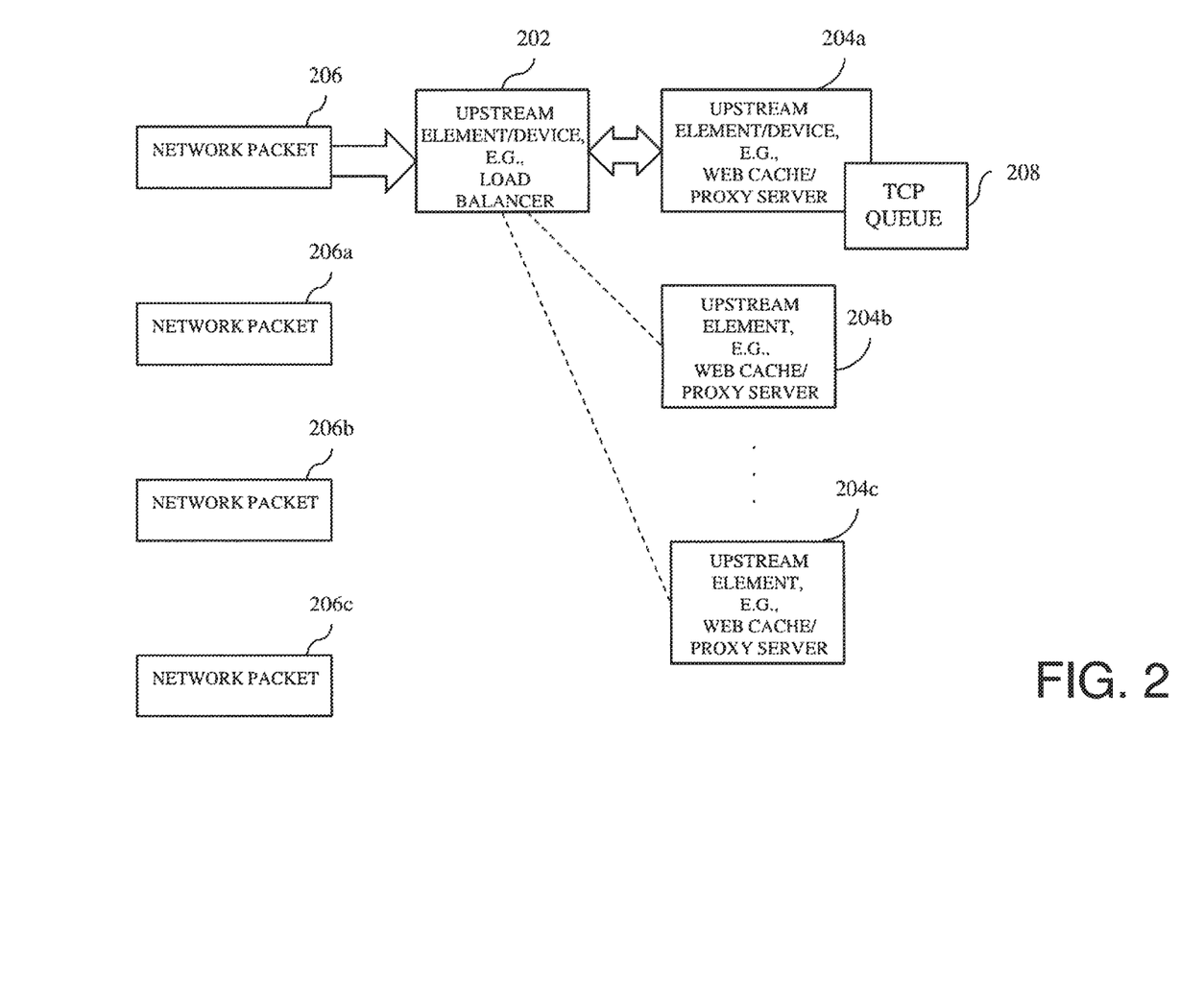
FIG. 2 shows an example of processing components utilizing a mechanism in one embodiment of the present disclosure.

FIG. 2 shows an example of processing components utilizing a mechanism in one embodiment of the present disclosure. Consider a setup for processing where the first box is a load balancer 202 which is used to distribute requests to three web caches 204a, 204b and 204c. The load balancer operates at the IP network protocol layer using the 5-tuple for indexing. The web caching proxies operate at the HTTP protocol layer and thus need to process the IP protocol, TCP protocol and HTTP protocol at their device. A typical web session includes a sequence of packets 206, 206a, 206b, 206c, etc. from the client, and it is not unusual to have hundreds of packets on a single web session. On the first arrival of an IP packet 206 on a request, e.g., the packet with the TCP SYN (connection establishment request) flag, the load-balancer 202 uses the 5-tuples in the IP header to decide which of the multiple web-caches to forward the request to, and may forward the request to the web-cache at 204a. The IP protocol processing code in the web-cache 204a uses the 5-tuples fields to determine which TCP queue 208 to insert the incoming bytes into, and subsequently the TCP processing layer at the web cache 204a performs TCP protocol processing on the contents of the packet. In normal processing, both the load balancer 202 and the processing required at web cache 204a for inserting packets into the TCP queue 208 need to map the 5 tuple in the IP header to appropriate values. This procedure needs to be repeated for all the packets in the web session.

In a method of the present disclosure in one embodiment, the web cache 204a can avoid the mapping required to insert the packet into the TCP queue 208 by using the following mechanism. Suppose that the IP network layer processing at web-cache 204a computes that the specific queue 208 for a stream of packets from the client is located at the address 0xFF326456. Instead of performing a calculation of this address on every packet, the processing at web cache 204a performs the following. On the receipt of the first packet 206, the network processing code at web cache 204a calculates the address 0xFF326456. The network processing code at web cache 204a then invokes a command on the load-balancer 202 (e.g. by invoking a web-script permitted to be accessible only by a restricted set of machines) that requests the load-balancer 202 to include the tag of "56" into each packet having the matching 5-tuple. The TCP processor at the web-cache has a table mapping tag "56" to the address 0xFF326456, and the 5-tuples associated with it. The load-balancer 202 receives this request from the web-cache 204, and responsive to receiving subsequent packets with the same 5-tuple (such as packets 206a, 206b, 206c) arriving at the load-balancer 202, the load-balancer 202 sees that there was a request to mark such packets with the tag of 56, and the load-balancer 202 updates the tag field to be 56. When the request reaches the web-cache 204, the network processor at the web-cache looks up the tag of 56, compares the 5-tuple fields for validation and then proceeds with the request as normal. In this way, the web-cache 204 does not have to perform another search using the different fields of the 5-tuples (which can generate 2^100 combinations overall and is usually an expensive operation even with all the optimized searching algorithms developed for 5-tuples). By performing a slightly more complex state maintenance at the arrival of the first packet, the processing of subsequent hundreds of packets on the same web session can be made more efficient.

When a packet arrives with a tag, for instance, responsive to receiving a packet with a tag, the box may check that it is a tag that was generated by the box (itself) by using part of a tag to look into a table containing the 5-tuples used to generate the tag and check that they match. Since in this particular case, the number of field used for communications is limited (128) between the load-balancer 202 and the caching proxy 204, the caching proxy 204 may opt to use only sessions with properties that they are long lasting (e.g., TCP session which last beyond a minute) to be tagged by the front-end device. In these cases, the step of invoking a command on the load balancer 202 will not be invoked on the first packet of a TCP session, but only for the packet which arrives after the TCP session has lasted for a minute, or any other predefined interval. For example, whether to use the tagging mechanism, and on which packet to use it can be configurable and can be based on one or more criteria, for instance, the length of a communication session, the address of the client device, the time of the day, and/or others.

In one embodiment, the same mechanism can be used for other boxes that are using the same level of protocol fields for tagging in a series. At other protocol levels, the mechanism for communication and the fields used may be different, but a similar scheme can be used. As an example, if the protocol level is SOAP, a special XML tag may be used among the two boxes to implement the tagging mechanism. If the protocol level is HTTP, an extra field in the HTTP header can be used to implement the tagging mechanism. The similar mechanism can be applied in protocols where various network fields are encoded in formats like JavaScript Object Notation (JSON) by introducing an additional field. Other protocols where the mechanism can be used is in Representational State Transfer (REST) encoding of messages, or in messaging protocols like message queue (MQ), MQ Telemetry Transport (MQTT), Advanced Message Queuing Protocol (AMQP) or Constrained Application Protocol (COAP) that are used in Internet of Things (IoT) communication. The tagging mechanism in these protocols may be a special topic for messages or a special field added to the message in the messaging protocol. A similar additional field can be used for protocols like Web of Things. There are several protocols that allow the inclusion of a tag in a similar method.

Figure 3:
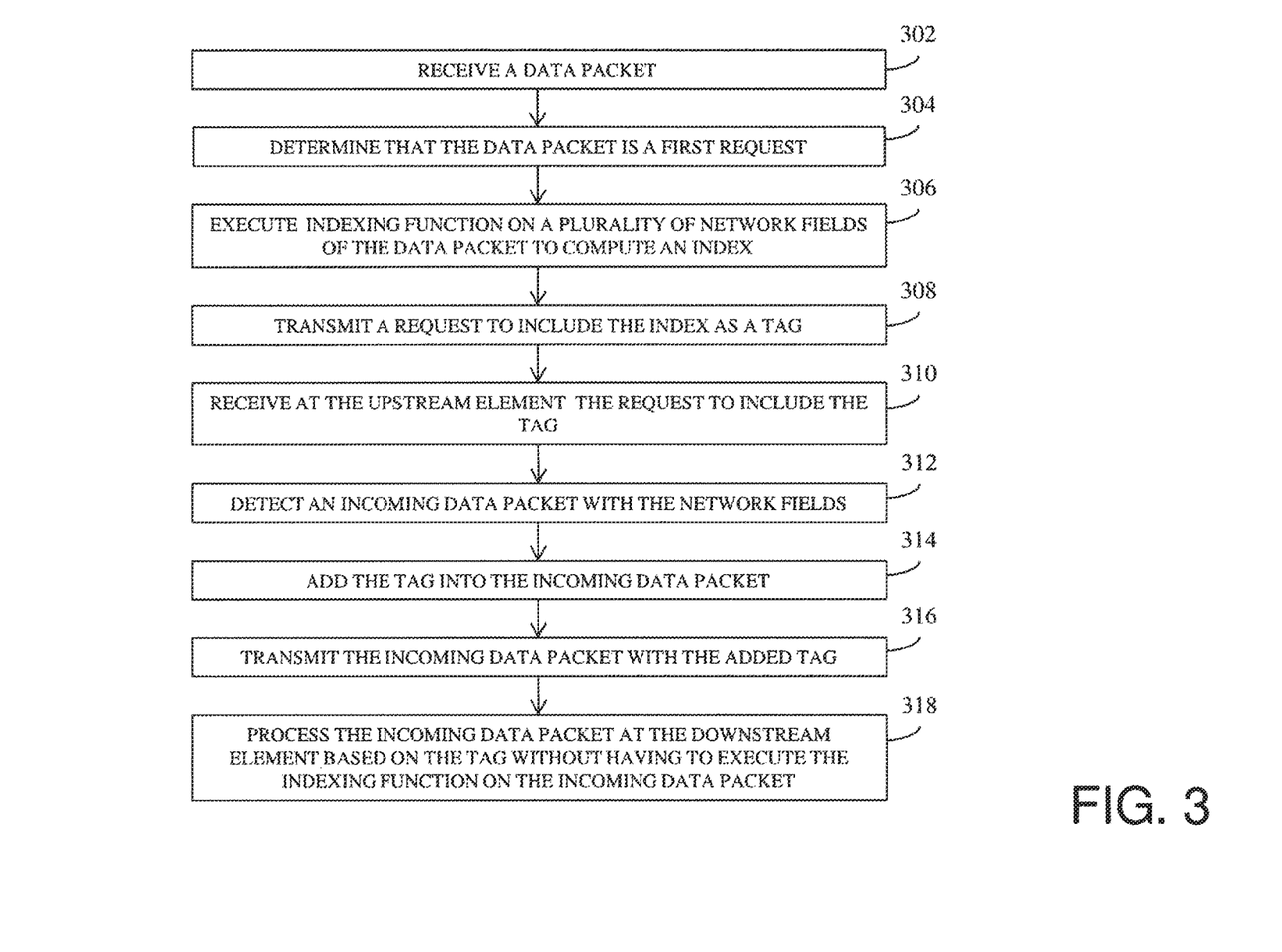
FIG. 3 is a diagram illustrating a method in one embodiment of the present disclosure.

FIG. 3 is a diagram illustrating a method in one embodiment of the present disclosure. The method may calculate efficient index in a system with an upstream element and a downstream element, for example, a pipeline of network proxies or network proxy functions (accelerators) that process a message, data packet or data transmission. An element receiving a request in a network flow may perform an indexing function on a plurality of fields. For example, multiple network appliances (e.g., hardware or software) also referred to as proxies may be aligned into a processing pipeline. A proxy may calculate its own state information and provide and calculate an index into the state information. In the present disclosure in one embodiment, downstream proxies may communicate the computed index to preceding element or elements in a pipeline, thus reducing the need to recalculate the index from the packet information on each packet arrival deeper in the pipeline. For instance, the index information that was calculated on the first walk through the pipeline is communicated to the front and is then attached on subsequent packets for downstream processing and is used to steer subsequent packets through the pipeline. There is no need to further compute the index at each stage (proxy) for subsequent packets.

At 302, a downstream element in a processing pipeline may receive a data packet comprising a request in a network flow. The processing pipeline includes a plurality of network elements. An upstream element (e.g., a load balancer) may receive a request from a requesting device, process it and pass it to a downstream element (e.g., a web cache proxy) for next processing in the pipeline, until the request reaches the destination, e.g., a server or the like. The data packet includes a plurality of network fields and associated values.

At 304, it is determined that the data packet is a first request received at the downstream element. For instance, if the data packet does not include a tag that indicates that an index has already been computed, it may be determined that the data packet is a first request the downstream element received.

At 306, the downstream element responsive to receiving the first request in a network flow performs or executes an indexing function on the plurality of network fields. The indexing function computes an index into a control block that stores state information associated with the data packet. A downstream element may include an intermediary computer component in a network of computers between two endpoint devices, for example, that may perform a processing function on data transmissions or packets being communicated between the two endpoint devices. Examples of the network fields may include IP source address, destination address, source port, destination port, and the protocol. An indexing function may include a hashing function.

At 308, the downstream element transmits a request to the upstream element to include the index as a tag in a subsequent data packet that has the same plurality of network fields and the associated values. The downstream element may transmit a result of the indexing function and the content of the plurality of network fields to the upstream element.

At 310, the upstream element receives the request to include the tag in the subsequent data packet having the same plurality of network fields and associated values.

At 312, the upstream element detects another incoming data packet. Responsive to detecting the incoming data packet, and based on the request from the downstream element, the upstream element determines whether the incoming data packet includes the same plurality of network fields and associated values.

At 314, responsive to determining that the incoming data packet includes the same plurality of network fields and associated values, the upstream element adds the tag into the data packet. So for example, the upstream element includes the result of the indexing function on a second request in the network flow.

At 316, the upstream element transmits the incoming data packet with the added tag to the downstream element.

At 318, the downstream element responsive to receiving the second request in the network flow uses the included result for performing its indexing function on the second request. For instance, the downstream element processes the subsequent data packet based on the tag that is included with the subsequent data packet without having to execute the indexing function on the subsequent data packet.

Embodiments of the present invention are capable of being implemented in conjunction with any other type of computing environment now known or later developed, for example, including cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
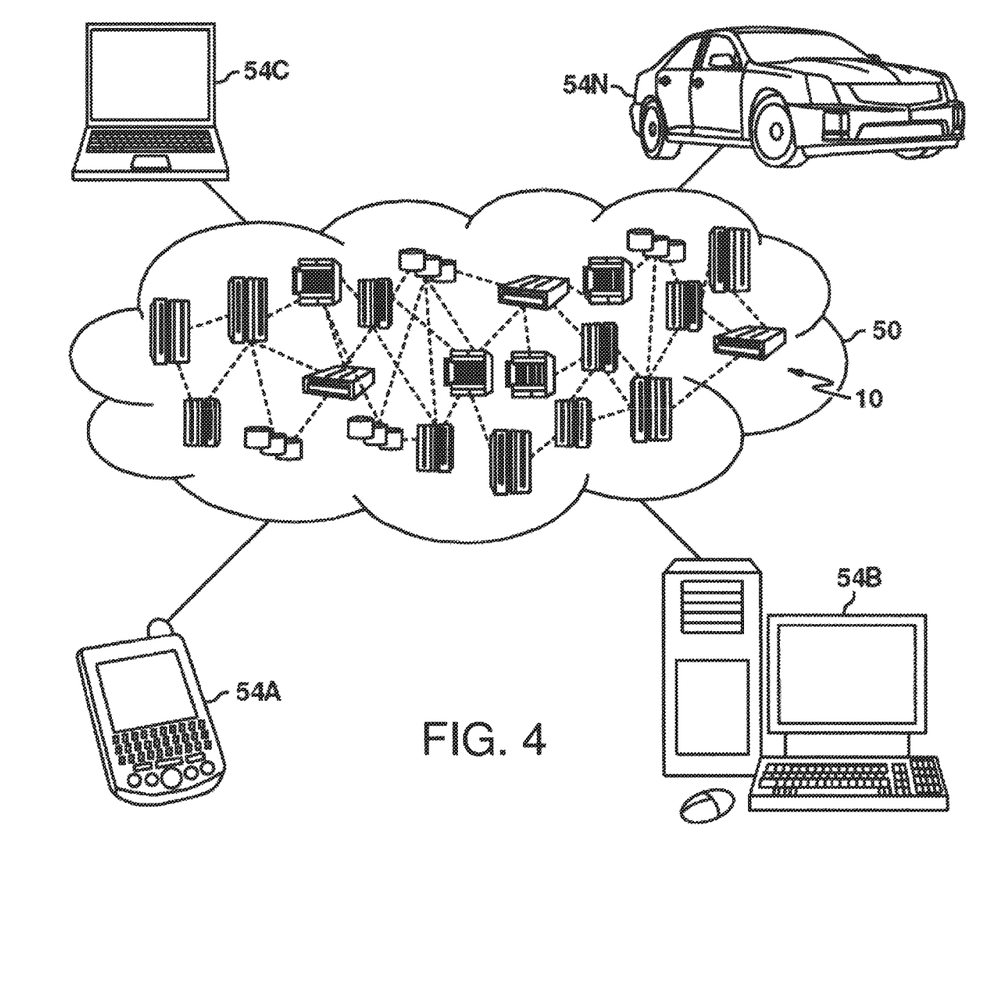
FIG. 4 illustrates cloud computing environment in one embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
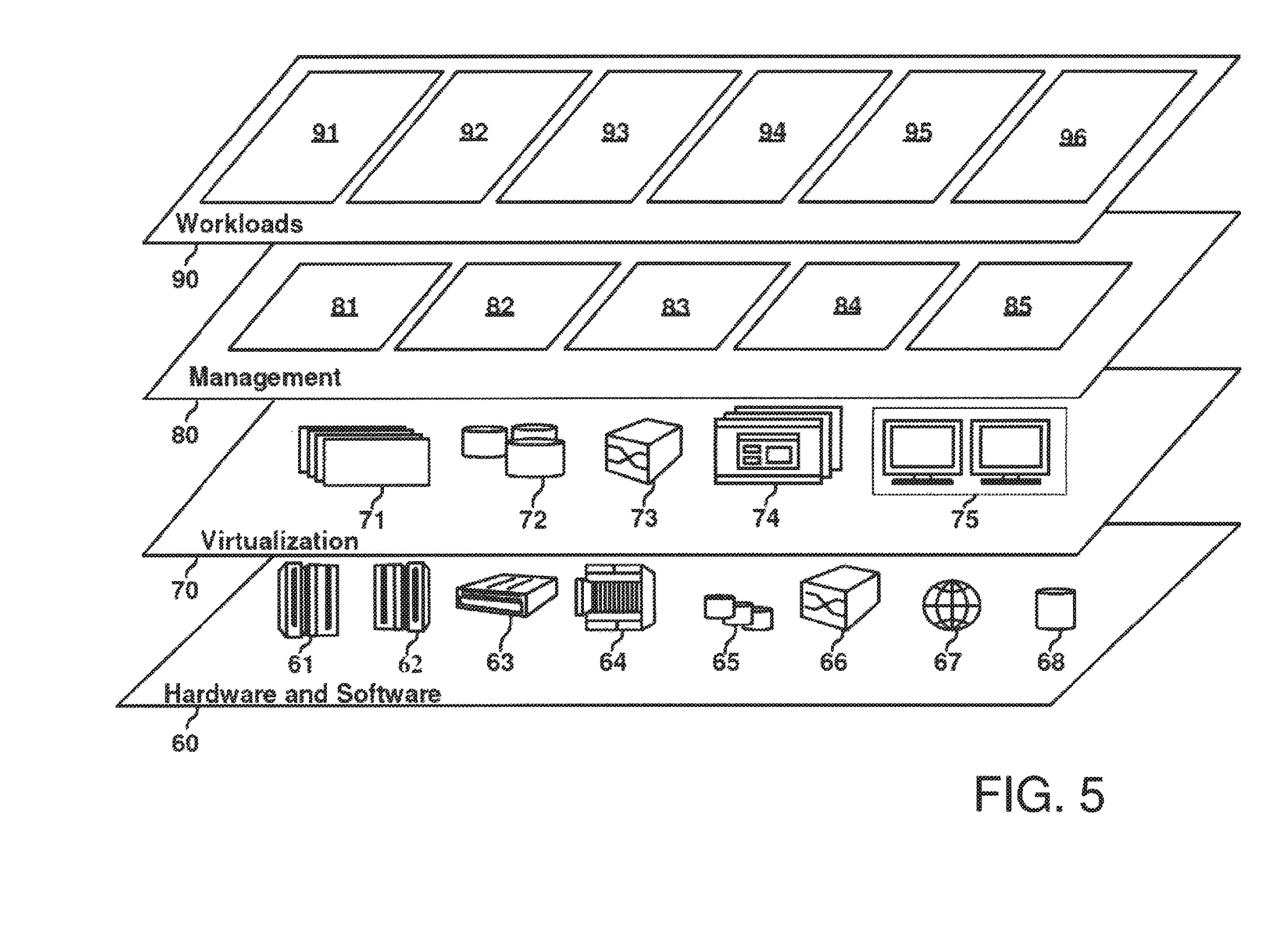
FIG. 5 illustrates a set of functional abstraction layers provided by cloud computing environment in one embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and another processing 96.

Figure 6:
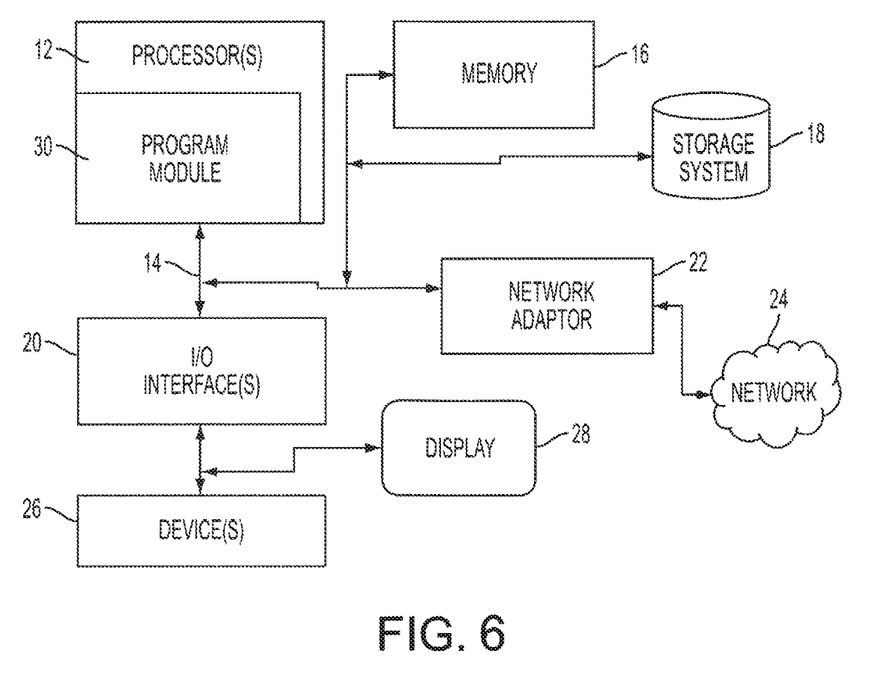
FIG. 6 illustrates a schematic of an example computer or processing system that may implement a protocol indexing system in one embodiment of the present disclosure.

FIG. 6 illustrates a schematic of an example computer or processing system that may implement a protocol indexing system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs an indexing function and communicating the indexing request to an upstream element described herein. In another aspect, the module 30 may perform a function of an upstream element described herein, for example, receiving a request from the downstream element to tag a data packet, monitoring for subsequent data packets that have the network fields, tagging the subsequent data packets and transmitting the subsequent data packets with tag to the downstream element. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of processing data packets in a pipeline of network proxies, comprising:
    receiving at a downstream element in the pipeline a data packet from an upstream element in the pipeline, the data packet comprising a plurality of network fields and associated values;
    determining that the data packet is a first request received to be tagged at the downstream element;
    executing an indexing function at the downstream element based on the plurality of network fields to compute an index into a control block for storing state information associated with the data packet;
    transmitting by the downstream element a request to the upstream element that sent the data packet that was untagged, to include the index as a tag in a subsequent data packet received at the upstream element that does not include the tag, and that comprises the plurality of network fields and the associated values, wherein the data packet and the subsequent data packet are a part of a series of data packets in a web session received at the upstream element;
    receiving at the downstream element the subsequent data packet from the upstream element with the tag; and
    processing the subsequent data packet at the downstream element based on the tag without having to execute the indexing function on the subsequent data packet.

2. The method of claim 1, further comprising:
    receiving at the upstream element the request to include the tag in the subsequent data packet that comprises the plurality of network fields and the associated values; and
    responsive to detecting an incoming data packet, determining whether the incoming data packet comprises the plurality of network fields and the associated values;
    responsive to determining that the incoming data packet comprises the plurality of network fields and the associated values, adding the tag into the data packet; and
    transmitting the incoming data packet to the downstream element.

3. The method of claim 1, wherein the determining that the data packet is a first request the downstream element received, comprises detecting that the data packet does not have the tag.

4. The method of claim 1, wherein the plurality of network fields comprises IP source address, destination address, source port, destination port and the protocol.

5. The method of claim 1, wherein the plurality of network fields comprises hypertext transfer protocol (HTTP) headers and fields contained within a HTTP cookie.

6. The method of claim 1, wherein the plurality of network fields comprises extensible marked language (XML) elements and fields embedded in a XML encoding.

7. The method of claim 1, wherein the plurality of the network fields comprises at least one of a field structured in a Javascript Object Notation (JSON) format, a topic contained in a messaging protocol including message queue Telemetry Transport (MQTT), and a topic contained in an Internet of Thing protocol including Web of Things.

8. The method of claim 1, wherein the upstream element comprises at least one of a load balancer, a fire wall and a proxy server; and the downstream element comprises at least a proxy server.

9. The method of claim 1, wherein the request transmitted to the upstream element to include the index as a tag in a subsequent data packet, comprises a result of the indexing function and content of the plurality of network fields.

10. A system of processing data packets in a pipeline of network proxies, comprising:
    at least one hardware processor, coupled to a communication network, executing instructions to provide a downstream element; and
    memory comprising a control block coupled to the downstream element;
    the downstream element receiving a data packet from an upstream element in the pipeline, the data packet comprising a plurality of network fields and associated values,
    the downstream element determining that the data packet is a first request the downstream element received,
    the downstream element executing an indexing function based on the plurality of network fields to compute an index into the control block for storing state information associated with the data packet,
    the downstream element transmitting a request to the upstream element that sent the data packet that was untagged, to include the index as a tag in a subsequent data packet received at the upstream element that does not include the tag, and that comprises the plurality of network fields and the associated values, wherein the data packet and the subsequent data packet are a part of a series of data packets in a web session received at the upstream element,
    the downstream element receiving the subsequent data packet from the upstream element with the tag, the downstream element processing the subsequent data packet based on the tag without having to execute the indexing function on the subsequent data packet.

11. The system of claim 10, further comprising:
at least one other hardware processor executing instructions to provide an upstream element, the upstream element coupled to the downstream element via the communication network,
the upstream element receiving the request to include the tag in the subsequent data packet that comprises the plurality of network fields and the associated values,
responsive to detecting an incoming data packet, the upstream element determining whether the incoming data packet comprises the plurality of network fields and the associated values,
responsive to determining that the incoming data packet comprises the plurality of network fields and the associated values, the upstream element adding the tag into the data packet,
the upstream element transmitting the incoming data packet to the downstream element.

12. The system of claim 10, wherein the determining that the data packet is a first request the downstream element received, comprises detecting that the data packet does not have the tag.

13. The system of claim 10, wherein the plurality of network fields comprises IP source address, destination address, source port, destination port and the protocol.

14. The system of claim 10, wherein the plurality of network fields comprises hypertext transfer protocol (HTTP) headers and fields contained within a HTTP cookie.

15. The system of claim 10, wherein the plurality of network fields comprises extensible marked language (XML) elements and fields embedded in a XML encoding.

16. The system of claim 10, wherein the plurality of the network fields comprises at least one of fields structured in a Javascript Object Notation (JSON) format, a topic contained in a messaging protocol including message queue Telemetry Transport (MQTT), and a topic contained in an Internet of Thing protocol including Web of Things.

17. The system of claim 10, wherein the upstream element comprises at least one of a load balancer, a fire wall and a proxy server; and the downstream element comprises at least a proxy server.

18. The system of claim 10, wherein the request transmitted to the upstream element to include the index as a tag in a subsequent data packet, comprises a result of the indexing function and content of the plurality of network fields.

19. A non-transitory computer readable storage medium storing a program of instructions executable by a machine to perform a method of processing data packets in a pipeline of network proxies, the method comprising:
receiving at a downstream element in the pipeline a data packet from an upstream element in the pipeline, the data packet comprising a plurality of network fields and associated values;
determining that the data packet is a first request the downstream element received;
executing an indexing function at the downstream element based on the plurality of network fields to compute an index into a control block for storing state information associated with the data packet;
transmitting by the downstream element a request to the upstream element that sent the data packet that was untagged, to include the index as a tag in a subsequent data packet received at the upstream element that does not include the tag, and that comprises the plurality of network fields and the associated values, wherein the data packet and the subsequent data packet are a part of a series of data packets in a web session received at the upstream element;
receiving at the downstream element the subsequent data packet from the upstream element with the tag; and
processing the subsequent data packet at the downstream element based on the tag without having to execute the indexing function on the subsequent data packet.

20. The non-transitory computer readable storage medium of claim 19, further comprising:
receiving at the upstream element the request to include the tag in the subsequent data packet that comprises the plurality of network fields and the associated values; and
responsive to detecting an incoming data packet, determining whether the incoming data packet comprises the plurality of network fields and the associated values;
responsive to determining that the incoming data packet comprises the plurality of network fields and the associated values, adding the tag into the data packet; and
transmitting the incoming data packet to the downstream element.

* * * * *